UNITED STATES PATENT OFFICE.

PAUL JULIUS, OF LUDWIGSHAFEN, GERMANY, ASSIGNOR TO BADISCHE ANILIN & SODA FABRIK, OF SAME PLACE.

DISAZO DYE.

SPECIFICATION forming part of Letters Patent No. 677,227, dated June 25, 1901.

Application filed February 21, 1901. Serial No. 48,335. (Specimens.)

*To all whom it may concern:*

Be it known that I, PAUL JULIUS, doctor of philosophy and chemist, a subject of the Emperor of Austria-Hungary, residing at Ludwigshafen-on-the-Rhine, in the Kingdom of Bavaria and Empire of Germany, have invented new and useful Improvements in Disazo Dyes, of which the following is a specification.

If the nitro-amido-phenol-sulfo-acid to which the constitution

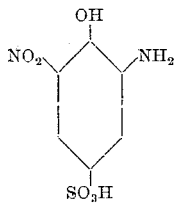

is attributed—that is, the para-sulfo-acid of ortho-nitro-ortho-amido-phenol (see Letters Patent granted to me, No. 644,234, dated 27th of February, 1900)—be reduced, the corresponding diamido-phenol-sulfo-acid is obtained. Upon diazotizing this diamido-phenol-sulfo-acid a tetrazo compound results, and I have discovered that this tetrazo compound upon combination first with one of the components hereinafter set forth and then with a second of such components new mixed or unsymmetrical disazo coloring-matters are obtained which possess excellent qualities. The coloring-matters so obtained dye wool from the acid-bath, giving shades which vary from bluish violet to greenish blue, and upon treating the dyed goods with potassium bichromate violet shades become bluer and greenish shades become greener, while all become more intense and assume a great fastness against the action of milling, washing, and light. Further, the shades so obtained do not suffer when the goods are steamed or carbonized.

The components which I use in the manufacture of my new mixed disazo coloring-matters are beta-naphthol, 2.3.6 beta-naphthol-disulfo-acid, and 2.6 beta-naphthol-mono-sulfo-acid, alpha-naphthylamin, naphthionic acid, 2.6 naphthylamin-sulfo-acid, 1.4 naphthol-sulfo-acid, 1.8 amido-naphthol-4-sulfo-acid, 2.5.7 amido-naphthol-sulfo-acid, resorcin, and meta-phenylene-diamin, and I wish it to be understood that my new coloring-matters result from the combination of one molecular proportion of the tetrazo compound hereinbefore mentioned with one molecular proportion of each of two of the said components.

Although I do not claim the process for the production of the diamido-phenol-sulfo-acid, I give the following example of a method by which it may be obtained for the sake of clearness, the parts being by weight:

Example 1: Dissolve about four hundred and sixty-eight (468) parts of ortho-nitro-ortho-amido-phenol-para-sulfo-acid in two thousand (2,000) parts of hot water. Stir the solution and slowly add about seven hundred and fifty (750) parts of zinc-dust and subsequently, in small portions at a time, about two thousand (2,000) parts of hydrochloric acid, (containing about thirty-two per cent. of real HCl.) Allow the solution to cool, collect the precipitate, and redissolve it in hydrochloric acid. Filter the solution and neutralize it exactly with carbonate of soda. The desired diamido-phenol-sulfo-acid separates out as free acid in the form of a slightly-yellowish crystalline precipitate. Collect by filtering, wash with cold water, and dry carefully.

The following example will serve to illustrate the manner in which my invention can be carried into practical effect and new coloring-matter obtained, the parts being by weight:

Example 2: Prepare a solution of about two hundred and four (204) parts of the diamido-phenol-para-sulfoacid, obtained as described in the foregoing example, in three thousand (3,000) parts of water containing four hundred and sixty (460) parts of hydrochloric acid, (containing thirty-two per cent. of HCl.) To this solution when cold add gradually one hundred and thirty-eight (138) parts of sodium nitrite dissolved in four hundred (400) parts of water. The tetrazo compound is soon formed and partially separates out. Run the solution or suspension of the tetrazo compound thus obtained into a solution of three hundred and fifty (350) parts of "R" salt (that is, sodium salt of 2.3.6 naphthol-disulfo-acid) in three thousand (3,000) parts of water containing also dissolved in it about three hundred (300) parts of crystallized sodium acetate. Stir the mixed solutions for about two (2) hours, while maintaining their temperature at about forty (40°) degrees centigrade. The intermediate product obtained separates out to a great extent, so that a red paste is obtained. To this add sufficient carbonate of soda to render it alkaline and then add a solution of one hundred and forty-four (144) parts of beta-naphthol in seven hundred parts of water and one hundred and twenty (120) parts of caustic-soda lye, (containing about thirty-five per cent. of NaOH.) Stir the mixture thus obtained again for about two (2) hours at a temperature between forty (40°) and fifty (50°) degrees centigrade. The desired coloring-matter is soon formed and may in part separate out. Boil the mixture and precipitate the coloring-matter from the boiling solution with common salt.

In a similar manner other coloring-matter can be prepared according to this invention by the use of the other components hereinbefore set forth. Of course the conditions of combination must be suitably varied, as will readily be understood by dye-chemists. For instance, when combining the tetrazo compound with alpha-naphthylamin it is best to work in hydrochloric-acid solution.

In the present application I desire to claim, generically, the mixed disazo coloring-matter, such as can be obtained from one molecular proportion of the tetrazo compound of the ortho-diamido-phenol-sulfo-acid and one molecular proportion of each of two of the aforesaid components. Further, I desire to claim, specifically, that mixed disazo coloring-matter which can be obtained from one molecular proportion of the said tetrazo compound and one molecular proportion each of 2.3.6 beta-naphthol-disulfo-acid and beta-naphthol.

The coloring-matter that I desire to claim, generically, is characterized by the following properties: It is soluble in water and dyes wool from the acid-bath, giving violet to bluish shades, which are changed in color and become faster upon boiling with a solution of potassium bichromate. Upon reduction, for instance, with stannous chlorid and hydrochloric acid or with zinc-dust the diamido-phenol-sulfo-acid is reproduced and at the same time amido bodies of the two components used in the production of the coloring-matter under observation are formed. The coloring-matter which I desire to claim, specifically, is soluble in water, giving a blue solution, which is not appreciably changed in color by the addition of a little solution of sodium carbonate and which turns violet upon the addition of caustic-soda solution and red upon the addition of hydrochloric acid. The solution in concentrated sulfuric acid is violet. It can readily be reduced, for instance, by stannous chlorid and hydrochloric acid or by zinc-dust, and when suitably reduced the three reduction products—diamido-phenol-sulfo-acid, amido-naphthol-disulfo-acid, and amido-naphthol—are formed and can be recognized.

Now what I claim is—

1. As a new article of manufacture the mixed disazo coloring-matter which can be obtained from diamido-phenol-sulfo-acid and herein-described aromatic dye components which is soluble in water, dyes wool from the acid-bath giving violet to bluish shades which change in color and become faster upon boiling with a solution of potassium bichromate and which upon suitable reduction yields diamido-phenol-sulfo-acid, and the amido derivatives of the two other components used in its manufacture, substantially as described.

2. As a new article of manufacture the new mixed disazo coloring-matter which can be obtained from diamido-phenol-sulfo-acid, 2.3.6 naphthol-disulfo-acid and beta-naphthol, which is soluble in water giving a blue solution which is not essentially changed in color by the addition of a little carbonate-of-soda solution but turns violet upon the addition of a little caustic-soda solution and red upon the addition of hydrochloric acid and which gives a violet solution in concentrated sulfuric acid and upon suitable reduction yields diamido-phenol-sulfo-acid, amido-naphthol-disulfo-acid, and amido-naphthol, substantially as described.

In testimony whereof I have hereunto set my hand in the presence of two subscribing witnesses.

PAUL JULIUS.

Witnesses:
ERNEST F. EHRHARDT,
JACOB ADRIAN.